United States Patent
Sirbasku et al.

(10) Patent No.: US 12,009,126 B2
(45) Date of Patent: Jun. 11, 2024

(54) RESISTOR SUPPORT ASSEMBLY WITH SPRING SEAT

(71) Applicant: Hamilton Sundstrand Corporation, Charlotte, NC (US)

(72) Inventors: Kyle S. Sirbasku, Rockford, IL (US); Dhaval Patel, Schaumburg, IL (US); Andrew R. Wilkinson, Cherry Valley, IL (US); Mary Christelle Ann Calacal, Rockford, IL (US); Yaser J. Isa, Cherry Valley, IL (US); Edward C. Allen, Davis, IL (US); Duane C. Johnson, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 145 days.

(21) Appl. No.: 17/200,827

(22) Filed: Mar. 13, 2021

(65) Prior Publication Data

US 2022/0293303 A1    Sep. 15, 2022

(51) Int. Cl.
| | | |
|---|---|---|
| H01C 1/01 | (2006.01) | |
| H02K 11/00 | (2016.01) | |
| H02K 7/00 | (2006.01) | |
| H02K 11/042 | (2016.01) | |

(52) U.S. Cl.
CPC ........... *H01C 1/01* (2013.01); *H02K 11/0094* (2013.01); *H02K 7/003* (2013.01); *H02K 11/042* (2013.01)

(58) Field of Classification Search
CPC ...... H01C 1/01; H02K 11/0094; H02K 7/003; H02K 11/042; H02K 19/36; H02K 19/38
See application file for complete search history.

(56) References Cited

U.S. PATENT DOCUMENTS

| | | | |
|---|---|---|---|
| 4,492,887 A | 1/1985 | Baldwin | |
| 5,219,617 A | 6/1993 | Howard et al. | |
| 5,440,282 A * | 8/1995 | Devendorf | H01R 24/42 439/578 |
| 5,451,731 A | 9/1995 | Yoshizumi et al. | |
| 9,035,508 B2 | 5/2015 | Grosskopf et al. | |
| 10,460,861 B1 * | 10/2019 | Patel | H02K 19/36 |
| 10,879,772 B2 | 12/2020 | Patel et al. | |
| 2008/0218035 A1 | 9/2008 | Naghshineh | |
| 2014/0226383 A1 | 8/2014 | Brust et al. | |
| 2015/0131233 A1 | 5/2015 | Kawauchi et al. | |
| 2016/0226348 A1 | 8/2016 | Rittmeyer | |

(Continued)

FOREIGN PATENT DOCUMENTS

| | | |
|---|---|---|
| EP | 2773031 A2 | 9/2014 |
| EP | 3758201 A1 | 12/2020 |
| GB | 2473535 A | 3/2011 |

OTHER PUBLICATIONS

Extended European Search Report for European Patent Application No. EP22161923.2, dated Sep. 5, 2022.

*Primary Examiner* — Christopher M Koehler
*Assistant Examiner* — Viswanathan Subramanian

(57) ABSTRACT

An assembly comprises a resistor support housing for a rotating rectifier assembly (RRA). A shaft bore is defined through the resistor support housing for passage of a shaft of an electrical machine. The resistor support housing defines a main annular body around the shaft bore. An end housing is mounted to one axial end of the resistor support housing. The end housing defines a portion of the shaft bore therethrough.

19 Claims, 2 Drawing Sheets

(56) References Cited

U.S. PATENT DOCUMENTS

2018/0316248 A1   11/2018  Patel et al.
2019/0390783 A1*  12/2019  Jedlinski ............. F16K 11/0712
2020/0220426 A1*   7/2020  Horng ................... F04D 25/062

* cited by examiner

RESISTOR SUPPORT ASSEMBLY WITH SPRING SEAT

BACKGROUND

1. Field

This disclosure relates generally to electrical machines and more particularly to resistor support assemblies for generators.

2. Description of Related Art

A typical variable frequency generator (VFG) can have a resistor assembly mounted in the rotor shaft. The resistor support assembly serves three functions in the rotor balance assembly. First, it is solidly mounted to the rotor shaft, providing an axial stop for the resistor assembly and rotating rectifier assembly (RRA) when installed in the rotor shaft. Second, the resistor support assembly grounds the resistor assembly to the rotor shaft. Third, the base of the resistor support assembly supports a spring used for the mechanical disconnect system of the VFG. Traditional designs for resistor support assemblies are made of steel and have two alignment pins installed for assembly purposes. These designs require additional hardware to be used in the resistor assembly to achieve proper functionality.

The conventional techniques have been considered satisfactory for their intended purpose. However, there is an ever present need for improved systems and methods for improved electrical and thermal conductivity within in a generator. This disclosure provides a solution for this need.

SUMMARY

An assembly comprises a resistor support housing for a rotating rectifier assembly (RRA). A shaft bore is defined through the resistor support housing for passage of a shaft of an electrical machine. The resistor support housing defines a main annular body around the shaft bore. An end housing is mounted to one axial end of the resistor support housing. The end housing defines a portion of the shaft bore therethrough.

An joining interface can be formed between the resistor support housing and the end housing, and the joining interface can be a press fit interface. The resistor support housing can be of a first material that is electrically conductive, and the end housing can be of a second material with higher mechanical strength than the first material. The resistor support housing can be of Aluminum and the end housing is of steel. The resistor support housing and end housing can be free of BeCu.

The assembly can include an anti-rotation tab extending axially from the end housing. The anti-rotation tab can be seated in an anti-rotation notch defined in the resistor support housing. A circumferential notch can be defined through a rim portion of the resistor support housing axially opposite the end housing. A circumferential spring seat can be defined around the end housing. The spring seat can be defined by an annular, axial facing surface of the end housing, and a radially outward facing surface of the end housing. The end housing can be engaged with an axially loaded disconnect spring in compression.

The resistor support housing and end housing can be assembled into a resistor package of a rotating rectifier assembly (RRA) of a variable frequency generator (VFG). The resistor support housing can be electrically connected as negative rail of a circuit of the RRA.

The assembly can further include a resistor plate assembly stacked axially with the resistor support housing and a resistor seated in the shaft bore of the resistor support housing. The resistor plate assembly can be axially engaged with the resistor. The resistor package can be mechanically between a diode package of the RRA and a disconnect spring, and the resistor package can be electrically between the diode package and one or more main field windings of the VFG.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
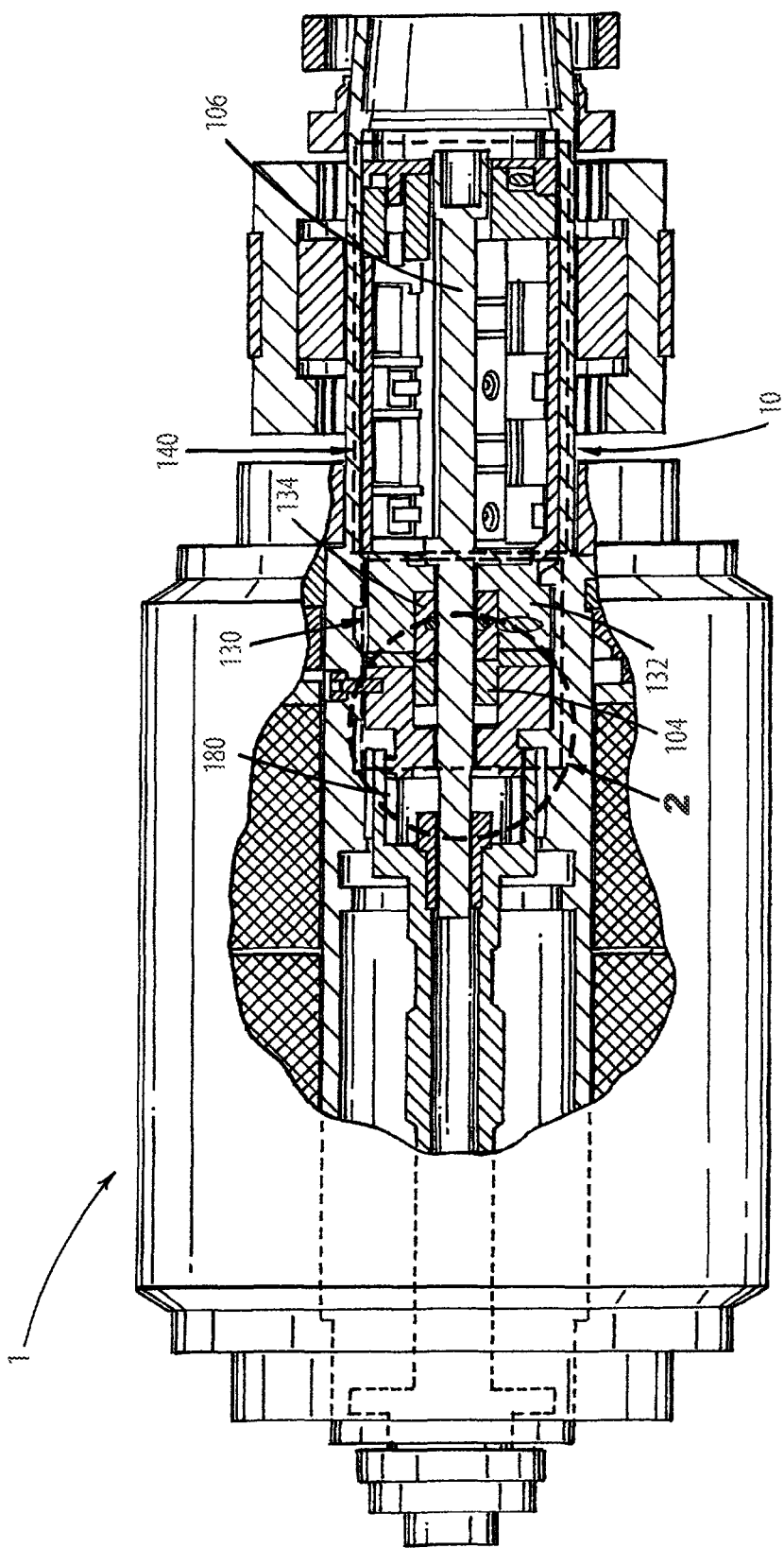
FIG. 1 is a schematic cross-sectional view of an embodiment of an assembly constructed in accordance with the present disclosure, showing a generator having a resistor housing assembly.

Reference will now be made to the drawings wherein like reference numerals identify similar structural features or aspects of the subject disclosure. For purposes of explanation and illustration, and not limitation, a partial view of an embodiment of an assembly in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to improve electrical and thermal conductivity within in a generator.

Figure 2:
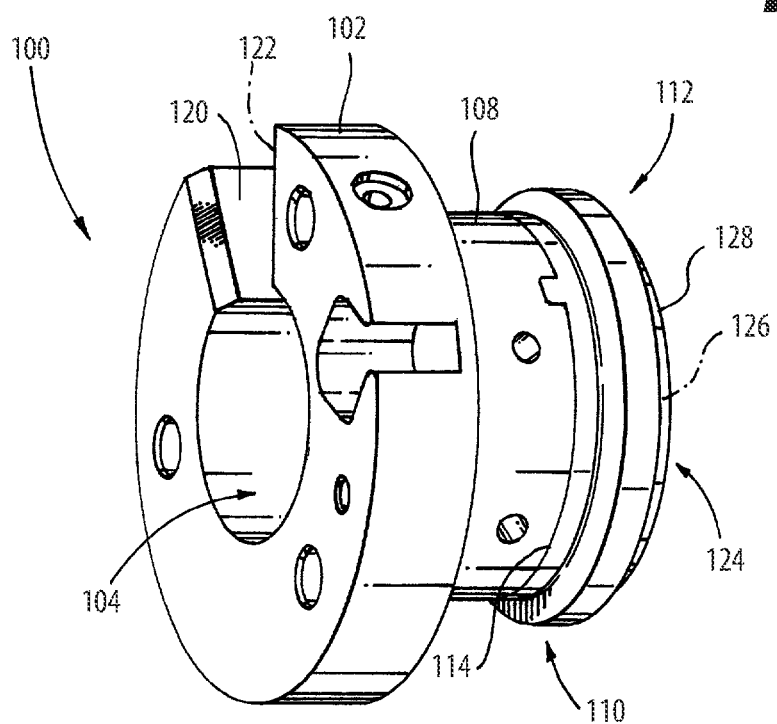
FIG. 2 is a schematic perspective view of the resistor housing assembly of FIG. 1.
Figure 3:
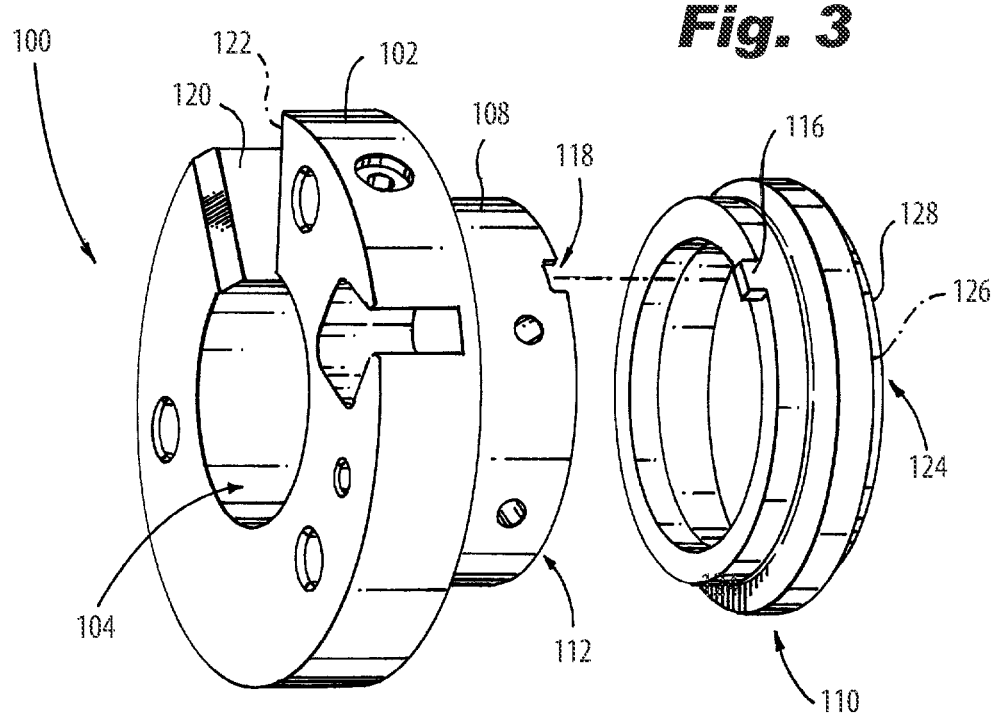
FIG. 3 is a schematic exploded perspective view of the resistor housing assembly of FIG. 2.

Shown in FIGS. 1-3, an assembly 100 can include a resistor support housing 102 for a rotating rectifier assembly (RRA) 10 which can be mounted in a resistor package 130 in a generator 1 (e.g. a brushless and/or variable frequency generator (VFG)). For example, the resistor support housing 102 can be electrically connected as negative rail of a circuit of the RRA 10. A shaft bore 104 can be defined through the resistor support housing 102 for passage of a shaft 106 of an electrical machine (e.g. VFG 1). The resistor support housing 102 can define a main annular body 108 around the shaft bore 104. An end housing 110 can be mounted to one axial end 112 of the resistor support housing 102 (as shown in FIG. 2). The end housing 110 can also define a portion shaft bore 104 therethrough, for example when resistor support housing 102 and end housing 110 are mounted as shown in FIG. 2.

The assembly 100 can further include a resistor plate assembly 132 stacked axially with the resistor support housing 102 and a resistor 134 seated in the shaft bore 104 of the resistor support housing 104. As shown, the resistor plate assembly 132 can be axially engaged with the resistor 134. The resistor package 130 can be mechanically situated between a diode package 140 of the RRA 10 and a disconnect spring 180. At the same time, the resistor package 130 can be electrically connected between the diode package 140 (e.g. via DC pins) and one or more main field windings 150 of the VFG 1.

An joining interface 114 can be formed between the resistor support housing 102 and the end housing 110. The joining interface 114 can be any suitable joining interface, for example, the joining interface 114 can be a press fit interface. In embodiments, the resistor support housing 102 can be of a first material that is electrically conductive (e.g. aluminum), and the end housing can be of a second material (e.g. steel), where the mechanical strength of the second material is higher than the mechanical strengths of the first material. Both the resistor support housing 102 and end housing 110 can free of Beryllium Copper (BeCu), however it is contemplated that the entire assembly 100 can be free of BeCu.

The assembly 100 can include an anti-rotation feature. The anti-rotation feature can include a tab 116 extending axially from the end housing 110. The anti-rotation tab 116 can be seated in an anti-rotation notch 118 defined in the resistor support housing 102. A circumferential notch 120 can be defined through a rim portion 122 of the resistor support housing 102 axially opposite the end housing 110. A circumferential spring seat 124 can be defined around the end housing 110. For example, the spring seat can be defined by an annular, axial facing surface 126 of the end housing 110, and a radially outward facing surface 128 of the end housing 110. When assembled, the end housing 110 can be engaged with an axially loaded disconnect spring 180 in compression.

The methods and systems of the present disclosure, as described above and shown in the drawings, provide for reduced manufacturing cost and part complexity, and improved electrical and thermal conductivity of the resistor plate within the VFG. While the apparatus and methods of the subject disclosure have been shown and described, those skilled in the art will readily appreciate that changes and/or modifications may be made thereto without departing from the scope of the subject disclosure.

What is claimed is:

1. An assembly comprising:
    a resistor support housing for a rotating rectifier assembly (RRA), wherein a shaft bore is defined through the resistor support housing for passage of a shaft of an electrical machine, wherein the resistor support housing defines a main annular body around the shaft bore;
    an end housing mounted to the main annular body at one axial end of the resistor support housing at a joining interface via press fit, wherein the end housing defines a portion of the shaft bore therethrough; and
    an anti-rotation tab extending axially from the end housing, wherein the anti-rotation tab is seated in an anti-rotation notch defined in the main annular body with the end housing mounted to the main annular body at the joining interface, wherein the anti-rotation tab is defined at least partially in the joining interface;
    wherein the resistor support housing is of Aluminum, wherein the end housing is of steel.

2. The assembly as recited in claim 1, wherein the resistor support housing is of a first material that is electrically conductive, and wherein the end housing is of a second material with higher mechanical strength than the first material.

3. The assembly as recited in claim 1, wherein a circumferential notch is defined through a rim portion of the resistor support housing axially opposite the end housing.

4. The assembly as recited in claim 1, wherein a circumferential spring seat is defined around the end housing, wherein the spring seat is defined by an annular, axial facing surface of the end housing, and a radially outward facing surface of the end housing.

5. The assembly as recited in claim 4, wherein the resistor support housing and end housing are free of Beryllium Copper (BeCu).

6. The assembly as recited in claim 1, wherein the resistor support housing and end housing are assembled into a resistor package of a rotating rectifier assembly (RRA) of a variable frequency generator (VFG).

7. The assembly as recited in claim 6, wherein the end housing is engaged with an axially loaded disconnect spring in compression.

8. The assembly as recited in claim 6, wherein the resistor support housing is electrically connected as negative rail of a circuit of the RRA.

9. The assembly as recited in claim 6, further comprising:
    a resistor plate assembly stacked axially with the resistor support housing; and
    a resistor seated in the shaft bore of the resistor support housing, wherein the resistor plate assembly is axially engaged with the resistor.

10. The assembly as recited in claim 9, wherein the resistor package is mechanically between a diode package of the RRA and a disconnect spring, and wherein the resistor package is electrically between the diode package and one or more main field windings of the VFG.

11. An resistor support housing for a rotating rectifier assembly (RRA), comprising:
    an annular body including a shaft bore defined therethrough for passage of a shaft of an electrical machine along a shaft axis, the body having a first annular end portion and a second annular end portion extending axially from the first annular end portion; and
    an annular end housing defining a second shaft bore therethrough, the annular end housing -configured to be press fit to the second annular end portion of the annular body, wherein with the annular body and the annular end housing press fit together, a joining interface is formed between the second annular end portion of the annular body and the annular end housing, wherein, an anti-rotation feature is defined within the joining interface including a notch formed within the second annular end portion and a tab extending from the end housing portion configured to be inserted into the notch,
    wherein the annular body is of a first material that is electrically conductive, and wherein the annular end housing is of a second material, different than the first material, with higher mechanical strength than the first material, wherein the first material is Aluminum and wherein the second material is steel.

12. The resistor support housing as recited in claim 11, wherein a circumferential notch is defined through a rim portion of the annular body in the first annular end portion.

13. The resistor support housing as recited in claim 11, wherein a circumferential spring seat is defined around the annular end portion, wherein the spring seat is defined by an annular, axial facing surface of the annular end portion, and a radially outward facing surface of the annular end portion.

14. The resistor support housing as recited in claim 13, wherein the annular body and the annular end portion are free of Beryllium Copper (BeCu).

15. The resistor support housing as recited in claim 11, wherein the annular body and the annular end portion are configured to assembled into a resistor package of a rotating rectifier assembly (RRA) of a variable frequency generator (VFG).

16. The resistor support housing as recited in claim 15, wherein the annular end portion is configured to be engaged with an axially loaded disconnect spring in compression.

17. The resistor support housing as recited in claim 15, wherein the annular body is configured to be electrically connected as negative rail of a circuit of the RRA.

18. The resistor support housing as recited in claim 15, further comprising:
   a resistor plate assembly stacked axially with the annular body; and
   a resistor seated in the shaft bore of the annular body, wherein the annular body is axially engaged with the resistor.

19. The resistor support housing as recited in claim 18, wherein the resistor package is mechanically between a diode package of the RRA and a disconnect spring, and wherein the resistor package is electrically between the diode package and one or more main field windings of the VFG.

* * * * *